United States Patent
Feliss et al.

(10) Patent No.: US 8,390,950 B2
(45) Date of Patent: *Mar. 5, 2013

(54) REDUCING THE OBSTRUCTION OF AIR FLOW THROUGH A BYPASS CHANNEL ASSOCIATED WITH A DISK DRIVE USING AN ELECTROSTATIC PASS-BY FILTER

(75) Inventors: Norbert A. Feliss, Aptos, CA (US); Donald R. Gillis, San Jose, CA (US); Ferdinand Hendriks, Morgan Hill, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/173,780

(22) Filed: Jun. 30, 2011

(65) Prior Publication Data

US 2011/0261484 A1 Oct. 27, 2011

Related U.S. Application Data

(62) Division of application No. 11/880,161, filed on Jul. 20, 2007, now Pat. No. 7,990,650.

(51) Int. Cl.
*G11B 33/14* (2006.01)
*G11B 33/12* (2006.01)

(52) U.S. Cl. .................................. 360/97.17

(58) Field of Classification Search .... 360/97.01–97.03, 360/97.16, 97.17; 118/606; 55/524, 527; 96/58

See application file for complete search history.

(56) References Cited

U.S. PATENT DOCUMENTS

| | | | |
|---|---|---|---|
| 4,392,876 A | 7/1983 | Schmidt | |
| 5,350,620 A | 9/1994 | Sundet et al. | |
| 5,367,417 A | 11/1994 | Brown et al. | |
| 5,468,529 A | 11/1995 | Kwon et al. | |
| 5,754,365 A | 5/1998 | Beck et al. | |
| 6,091,570 A * | 7/2000 | Hendriks | 360/97.03 |
| 6,387,141 B1 | 5/2002 | Hollingsworth et al. | |
| 6,395,073 B1 | 5/2002 | Dauber | |
| 6,636,379 B2 * | 10/2003 | Rannow et al. | 360/97.02 |
| 6,654,201 B2 | 11/2003 | Smith | |
| 6,924,326 B2 | 8/2005 | Meyer et al. | |
| 7,338,547 B2 | 3/2008 | Johnson et al. | |
| 7,990,650 B2 * | 8/2011 | Feliss et al. | 360/97.02 |
| 2003/0032694 A1 | 2/2003 | Meyer et al. | |
| 2004/0012881 A1 | 1/2004 | Hong et al. | |
| 2006/0150599 A1 | 7/2006 | Johnson et al. | |

FOREIGN PATENT DOCUMENTS

DE 10200503767 1/2007

(Continued)

OTHER PUBLICATIONS

English Translation of JP 02-281496 A to Yoshida, published on Nov. 19, 1990.*

(Continued)

*Primary Examiner* — Will J Klimowicz

(57) ABSTRACT

Embodiments of the present invention pertain to reducing the obstruction of air flow through a bypass channel associated with a disk drive. According to one embodiment, disk drive filtering system includes a selective filtering region, an electrostatic pass-by filter, and a filter free region. The selective filtering region is disposed within a bypass channel. The electrostatic pass-by filter is disposed within the selective filtering region and is used for filtering the air that flows through the selective filtering region. The filter free region is disposed proximate to the electrostatic pass-by filter so that a substantial portion of the air is allowed to flow unobstructed through the selective filtering region.

15 Claims, 8 Drawing Sheets

| | FOREIGN PATENT DOCUMENTS | | |
|---|---|---|---|
| JP | 60220119 A | * | 11/1985 |
| JP | 02281496 | | 11/1990 |
| JP | 03030808 | | 2/1991 |
| JP | 05166357 | | 7/1993 |
| KR | 2003024178 | | 3/2003 |
| WO | WO 9007382 A1 | * | 7/1990 |

OTHER PUBLICATIONS

English Translation of JP 05-166357 A to Takahashi, published on Jul. 2, 1993.*

* cited by examiner

REDUCING THE OBSTRUCTION OF AIR FLOW THROUGH A BYPASS CHANNEL ASSOCIATED WITH A DISK DRIVE USING AN ELECTROSTATIC PASS-BY FILTER

RELATED APPLICATIONS

The instant Application is a Divisional Application of and commonly owned patent application Ser. No. 11/880,161 (now U.S. Pat. No. 7,990,650), entitled "Reducing the Obstruction of Air Flow Through A Bypass Channel Associated With A Disk Drive Using an Electrostatic Pass-By Filter" by Feliss et al., with a filing date of Jul. 20, 2007, which is assigned to the assignee of the instant application and is incorporated herein in its entirety.

Co-pending and commonly owned patent application Ser. No. 11/880,161 claims priority to and incorporates the contents of the co-pending U.S. patent application Ser. No.: 11/486,883, and is entitled "Reducing the Obstruction of Air Flow through a Bypass Channel Associated with a Disk Drive" by Gillis et al., filed on Jul. 14, 2006, and assigned to the assignee of the present invention.

TECHNICAL FIELD

Embodiments of the present invention relate to filtering the air in a disk drive. More specifically, embodiments of the present invention relate to filtering the air in a disk drive while at the same time reducing the obstruction of air flow through a bypass channel.

BACKGROUND

Particles from outside of the disk drive can come into the disk drive or the particles can originate from within the disk drive. In the latter case, the particles may result from parts wearing against each other, from lubricating oil that is inside of the disk drive, or result from inadequate washing of disk drive components, among other things. In order to store and read data, the read write head flies close to the surface of the disk. A particle that comes between the air bearing surface of the read write head and the surface of the disk can cause damage to the disk as well as the read write head. Thus, data can be permanently lost and the disk drive can be ruined.

Therefore, it has always been important to maintain as clean an environment inside the disk drive as possible. Typically, a filter has been placed inside of a disk drive in order to maintain a clean environment. FIG. 1 depicts a prior art disk drive with a conventional filter. The disk drive 110 includes a base casting 113, a motor hub assembly 130, a disk 112, actuator shaft 132, actuator arms 134, suspension assembly 137, a hub 140, rotary voice coil motor 150, a magnetic read write head 156, a slider 155, a desiccant 160, and a conventional filter 174.

The components are assembled into a base casting 113, which provides attachment and registration points for components and subassemblies. A plurality of suspension assemblies 137 (one shown) can be attached to the actuator arms 134 (one shown) in the form of a comb. A plurality of transducer heads or sliders 155 (one shown) can be attached respectively to the suspension assemblies 137. Sliders 155 are located proximate to the disk 112's surface 135 for reading and writing data with magnetic heads 156 (one shown). The rotary voice coil motor 150 rotates actuator arms 134 about the actuator shaft 132 in order to move the suspension assemblies 137 to the desired radial position on a disk 112. The desiccant 160 is typically placed near the voice coil motor 150. The actuator shaft 132, hub 140, actuator arms 134, and voice coil motor 150 may be referred to collectively as a rotary actuator assembly.

Data is recorded onto disk surfaces 135 in a pattern of concentric rings known as data tracks 136. A disk's surface 135 is spun at high speed by means of a motor-hub assembly 130. Data tracks 136 are recorded onto spinning disk surfaces 135 by means of magnetic heads 156, which typically reside at the end of sliders 155.

FIG. 1 being a plan view shows only one head, slider and disk surface combination. One skilled in the art understands that what is described for one head-disk combination applies to multiple head-disk combinations, such as disk stacks (not shown). However, for purposes of brevity and clarity, FIG. 1 only shows one head and one disk surface. One skilled in the art understands that what is described for a disk drive with a single disk applies to a disk drive with multiple disks. The embodied invention is independent of the number of head disk combinations.

The spinning of the disk 112 causes air to move inside of the disk drive 110. In order to position the read write head 156 at the appropriate location, it is important that the actuator 132 not be subjected to excessive air turbulence. One of the purposes of the bypass channel 168 is to reduce the amount of air that passes by the actuator 134. Air tends to flow along the bypass channel 168 as indicated by the arrows 170 rather than by the actuator 134, thus, reducing the amount of air turbulence that the actuator 134 is subjected to.

Since the read write head 156 flies close to the surface of the disk 112 any particle that comes between the read write head 156 and the surface 135 of the disk 112 could result in potentially permanent damage to the disk 112 and loss of data. Therefore, the conventional filter 172 is used for cleaning the air (also referred to herein as the "environment") inside of the disk drive 110, thus, reducing the amount of particles inside of the disk drive 110. "Time to remove 90 percent of the particles" (also known as "T90") is a common measurement for the ability of a filter to clean 90% of the particles out of the disk's environment.

SUMMARY OF THE INVENTION

Embodiments of the present invention pertain to reducing the obstruction of air flow through a bypass channel associated with a disk drive. According to one embodiment, disk drive filtering system includes a selective filtering region, an electrostatic pass-by filter, and a filter free region. The selective filtering region is disposed within a bypass channel. The electrostatic pass-by filter is disposed within the selective filtering region and is used for filtering the air that flows through the selective filtering region. The filter free region is disposed proximate to the electrostatic pass-by filter so that a substantial portion of the air is allowed to flow unobstructed through the selective filtering region.

BRIEF DESCRIPTION OF THE DRAWINGS

The accompanying drawings, which are incorporated in and form a part of this specification, illustrate embodiments of the invention and, together with the description, serve to explain the principles of the invention.

Conventional Art

Conventional Art

Conventional Art

The drawings referred to in this description should not be understood as being drawn to scale except if specifically noted.

DETAILED DESCRIPTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Overview

Figure 1:
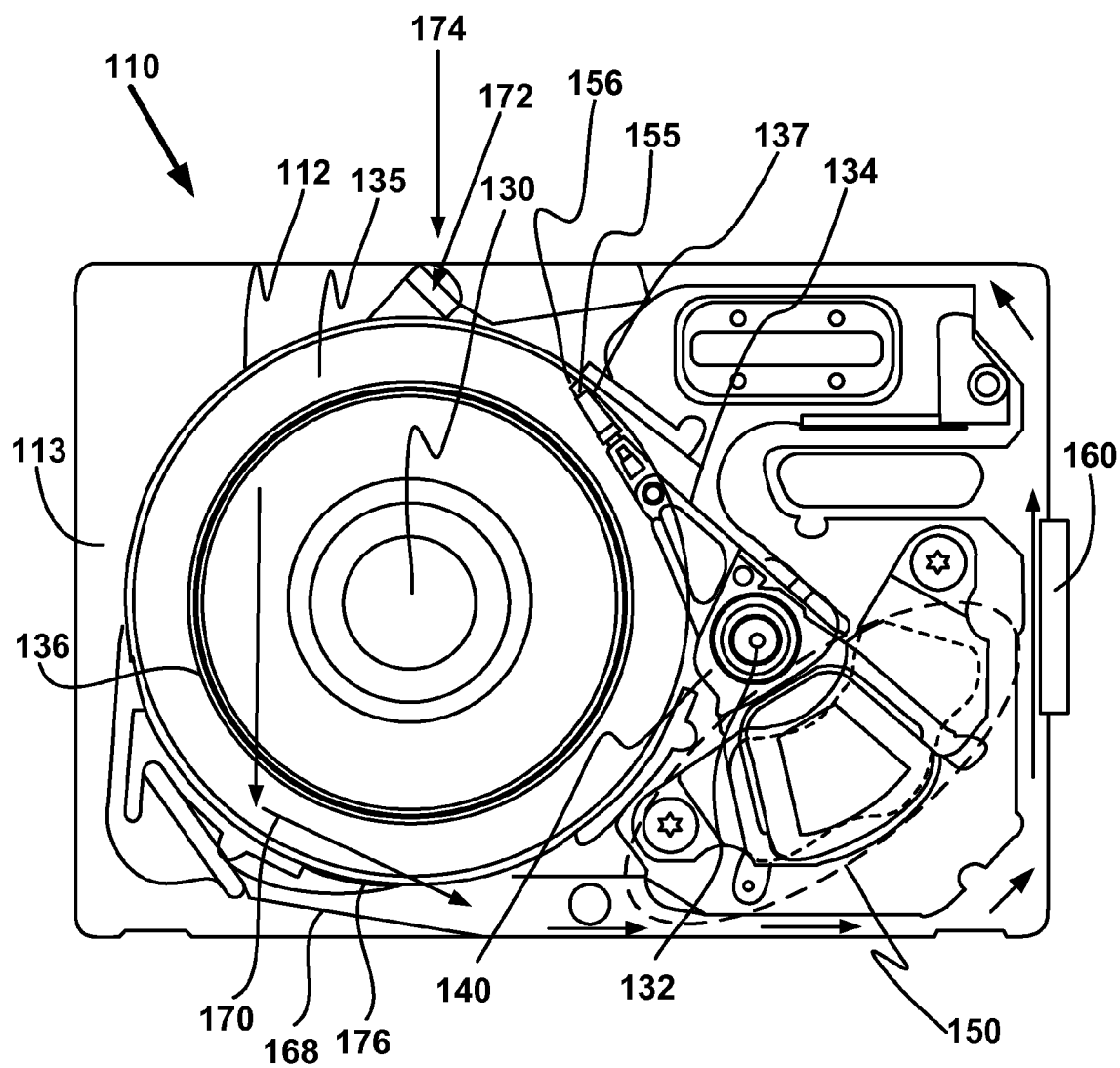
FIG. 1 depicts a plan view of an HDD with cover and top magnet removed.

There are several problems with the conventional air filter 172 as depicted in FIG. 1. First, it is important to have the air that flows 170 along the bypass channel 168 to re-enter the spinning disk 112 tangentially and at approximately the speed that the disk 135 is spinning. However, the air that flows through the bypass channel 168 is forced to go through the conventional filter 172 which disturbs the direction of the air flow and slows the air down. Therefore, the air is traveling faster when it exits from the spinning disk 112 at position 176 than after it passes through the conventional filter 172 at position 174. In order to compensate for the loss in speed due to air going through the conventional filter 172 the disk drive 110 consumes more electrical energy resulting in additional generation of heat.

Second, it is important that the actuator 140 be stable as the actuator is reading data or writing data. A measurement commonly known as tracks misregistration (TMR) is used for determining how far the read write head misses a track on a disk during a read or write operation. As can be seen, the more stable the actuator 140 is, the lower the TMR will be, and therefore data can be stored on a disk 112 at a higher density. However, since a conventional filter 172 causes turbulent air flow patterns, for example by causing too much turbulent air to pass by the actuator as described herein, the voice coil motor 150 has to work harder to keep the actuator 140 on track. This can result in a moderate increase in heat, for example, in a server farm with a hundred or more disk drives.

Third, the conventional filter 172 is typically limited in its ability to cleanup the environment inside of the disk drive 110. For example, the larger that the conventional filter 172 is the better and the more quickly it 172 can clean up the environment inside of the disk drive 110. However, the space inside of a disk drive 110 is limited therefore the size of a conventional filter 172 is limited. Further, the more the conventional filter 172 obstructs the bypass channel, the harder the disk drive 110 will have to work to force the air through the conventional filter 172. It has been found that the time constant effectiveness of a conventional filter 172 is limited to approximately 60 to 90 seconds due to the size restrictions of the conventional filter 172.

Therefore, there is a need for a disk drive filtering system that reduces the obstruction of air flow through a bypass channel associated with a disk drive and that does a better job of cleaning up the environment inside of the disk drive than the conventional filter 172. According to one embodiment, a filter is associated with a disk drive in a manner that the flow of air is substantially unobstructed, as will become more evident.

Filters

Figure 2A:
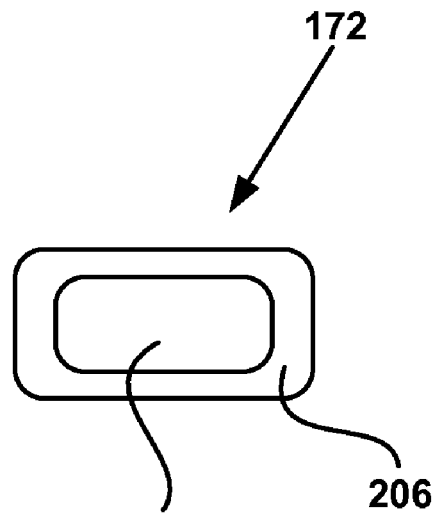
FIG. 2A depicts a conventional filter.
Figure 2B:
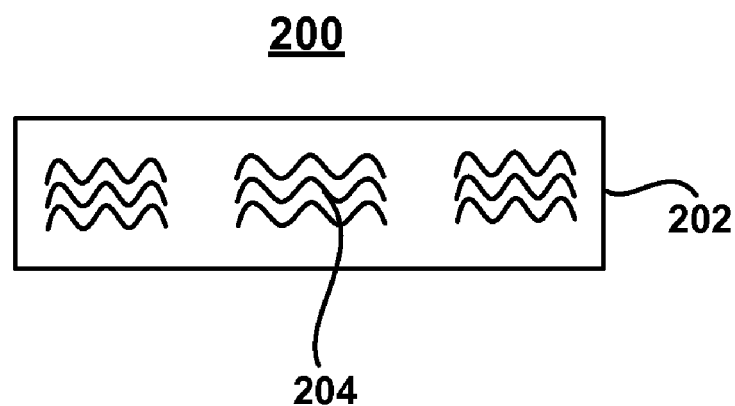
FIG. 2B depicts a pass-by filter according to one embodiment of the present invention.

FIG. 2A depicts a conventional filter 172. FIG. 2B depicts a pass-by filter 200 according to one embodiment of the present invention. The conventional filter 172 has a three dimensional shape due to edges 206 that are pressed together and a middle portion 208 that is not compressed together. In a conventional disk drive filtering system, air is forced to pass through the conventional filter 172. Further, as can be seen, the surface area of the conventional filter 172 is considerably smaller than pass-by filter 200.

According to one embodiment, filter 200 is a pass-by filter because air can freely flow across the pass-by filter 200 rather than being forced through the pass-by filter 200. Further, as will become more evident, pass-by filter 200 can provide considerably more surface area for cleaning the environment.

Pass-by filter 200 can include a carrier 202, such as clean room paper. The carrier 202 can have adhesive, such as pressure sensitive (PSA), on one or both sides. The various filtering materials 204 can be attached to one of the adhesive sides of the carrier 202 and the other adhesive side can be attached to the disk drive, as will become more evident. In another embodiment, various filtering materials 204 can be fused to the carrier 202 instead of using an adhesive. According to another embodiment, the pass-by filter 200 can be attached to the disk drive using slots or tabs instead of adhesive. Adhesive, slots and tabs are examples of holding structures that enable the pass-by filter to be attached to the disk drive.

According to one embodiment, a pass-by filter does not include a carrier 202. For example, a pass-by filter can be made from a liquid that is sprayed or painted, for example, on to a portion of a disk drive. The liquid can include various filtering materials 204. The liquid may also include an adhesive. In another example, a pass-by filter can be made of filtering materials 204 that are loose fibers that can be blown onto a portion of a disk drive. Adhesive may be applied to portions of a disk drive that the loose fibers are blown onto. After the loose fiber application, any non-bonded fibers can be cleaned up from the hard disk drive by selective vacuuming. In a third example, at least a part of the filtering materials 204 that a pass-by filter includes may be woven together or at least a part of the filtering materials 204 may be fused together. In a fourth example, filtering materials 204 can be used to create the structure of the pass-by filter 200 for example by weaving the filtering materials together or by fusing the filtering materials together using heat and pressure. In a fifth example, the filtering materials are fused together only at the outer edges so that the pass-by filter's middle is highly porous. Filtering materials may or may not be associated with a carrier 202 as a part of using a weaving embodiment or a fusing embodiment.

Various filtering materials 204 such as material for filtering chemicals, electrostatic media and impact media can be associated with the pass-by filter, which may or may not include a carrier 202. The impact media can be used for filtering relatively large particles that will collide into the pass-by filter. The electrostatic media can be used for filtering particles that are too small to cause collision. Typically electrostatic media has negative and positive charges. Therefore, the electrostatic media can attract negatively or positively charged particles that are too small to otherwise collide with the pass-by filter. Material for filtering chemicals, such as activated carbon, can filter chemical vapors such as hydrocarbons or fluorocarbons.

A Disk Drive Filtering System that Reduces the Obstruction of Air Flow

Figure 3A:
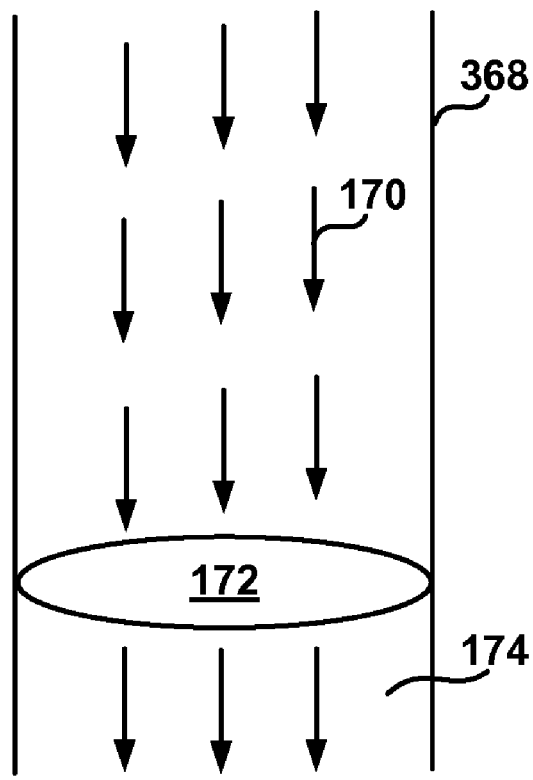
FIG. 3A depicts a conventional disk drive filtering system which obstructs the air flow through a bypass channel associated with a disk drive.
Figure 3B:
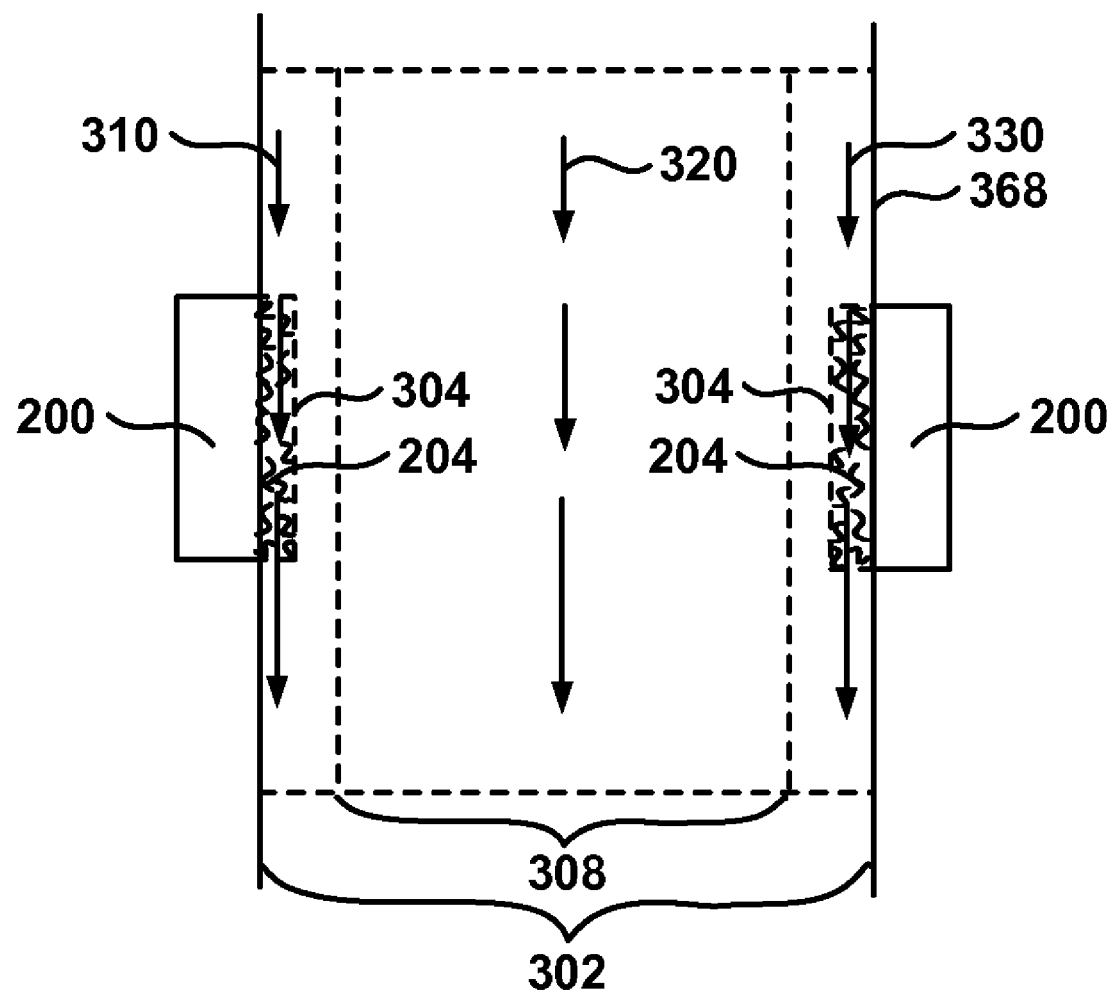
FIGS. 3B-3D depict disk drive filtering systems for reducing the obstruction of air flow through a bypass channel associated with a disk drive, according to one embodiment.

FIG. 3A depicts a conventional disk drive filtering system which obstructs the air flow through a bypass channel associated with a disk drive. FIG. 3A includes a conventional disk drive filtering system 300A with a conventional filter 172 that the air, as indicated by the arrows 170, is forced to flow through. The reference number 174 indicates a region in the bypass channel 368 after the air has been forced to flow through the conventional filter 172 and is about to re-enter the region where the disk 112 is spinning In contrast, FIG. 3B depicts a disk drive filtering system for reducing the obstruction of air flow through a bypass channel associated with a disk drive, according to one embodiment. The disk drive filtering system 300B includes a selective filtering region 302, electrostatic pass-by filters 200, a filter free region 308, and filter regions 304. The pass-by filters 200 that are associated with the disk drive filtering system 300B are pass-by filters because air can freely pass across the pass-by filter 200 rather than being forced through the pass-by filter 200. The pass-by filters 200, according to one embodiment, are electrostatic pass-by filters because they are electro statically charged to attract particles of an opposite charge. The selective filtering region 302 is disposed within a bypass channel 368. The selective filtering region 302 includes one or more filtering regions 304 where portions of air 310, 330 can be filtered and a filter free region 308 where another portion of air 320 is allowed to flow substantially unobstructed through the selective filtering region 302.

Portions of air 310 and 330 are filtered by the pass-by filters 200, for example, as the portions of air 310, 330 flow through or proximate to the filtering materials 204 associated with the pass-by filters 200. The filter free region 308 is disposed proximate to the pass-by filters 200. The amount of air 320 flowing through the filter free region 308 is significantly larger than the amount of air 310, 330 flowing through the filtering regions 304. Air 310 is commonly referred to as the boundary layer flow and air 320 is commonly referred to as the mean flow at the center of a channel. Further, when air flows substantially unobstructed through the selective filtering region 302 it stands to reason, according to one embodiment, that the air can flow substantially unobstructed through the bypass channel 368 which includes the selective filtering region 302.

Although the portions of air 310, 320, 330 are depicted with straight arrows, air typically swirls around as it flows within a bypass channel 368. Therefore, one set of air particles maybe in the filter free region 308 at one point in time and then be in a filtering region 304 at another point in time. However, it should still be evident to one of ordinary skill in the art that various embodiments of the present invention provide for air flow that is substantially unobstructed.

The air has its highest velocity and pressure when it exits the spinning disk. The pressure and velocity of the air decreases as the air travels around the bypass channel. The air tends to be at its lowest velocity and pressure when it re-enters the area of the spinning disk. When the selective filtering region 302 is placed in a high-pressure zone, many particles can be trapped by the pass-by filter as the air moves freely across or near the fibers of the pass-by filter. Alternatively, when the pass-by filter is in a low-pressure zone, particles may still be captured since the net trapping efficiency is high due to the large filter area associated with a bypass channel, according to one embodiment. In this way, both the high and low pressure zones of a disk drive can be used to trap particles.

Figure 3C:
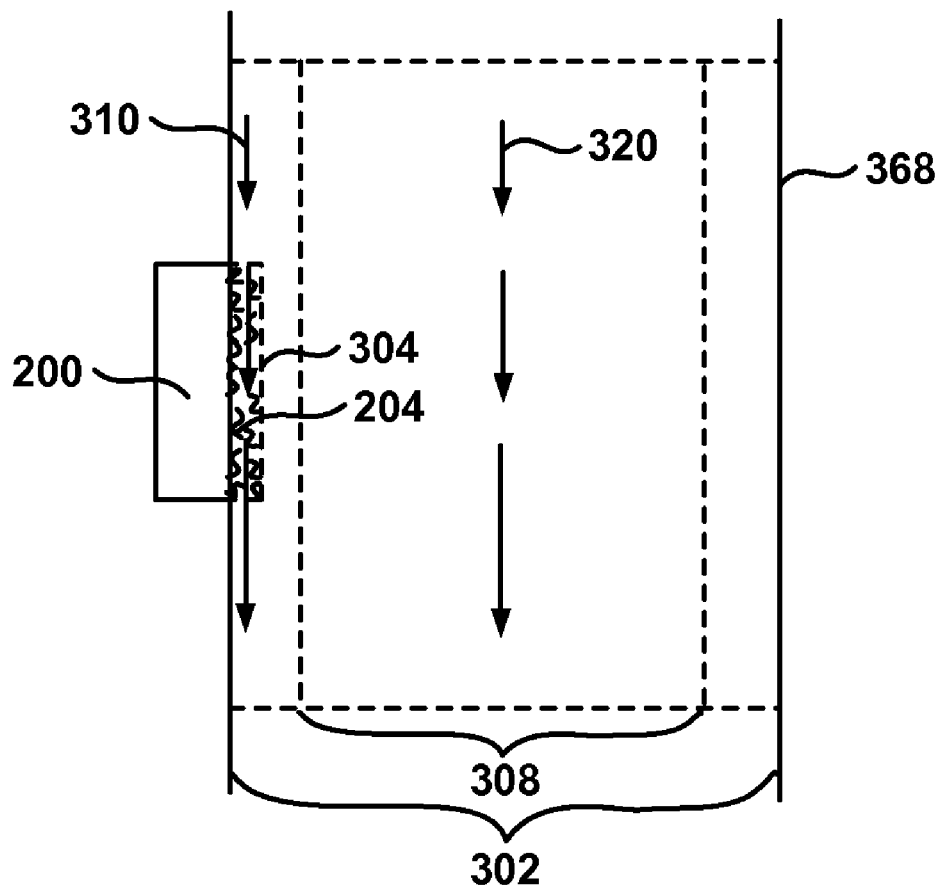
Figure 3D:
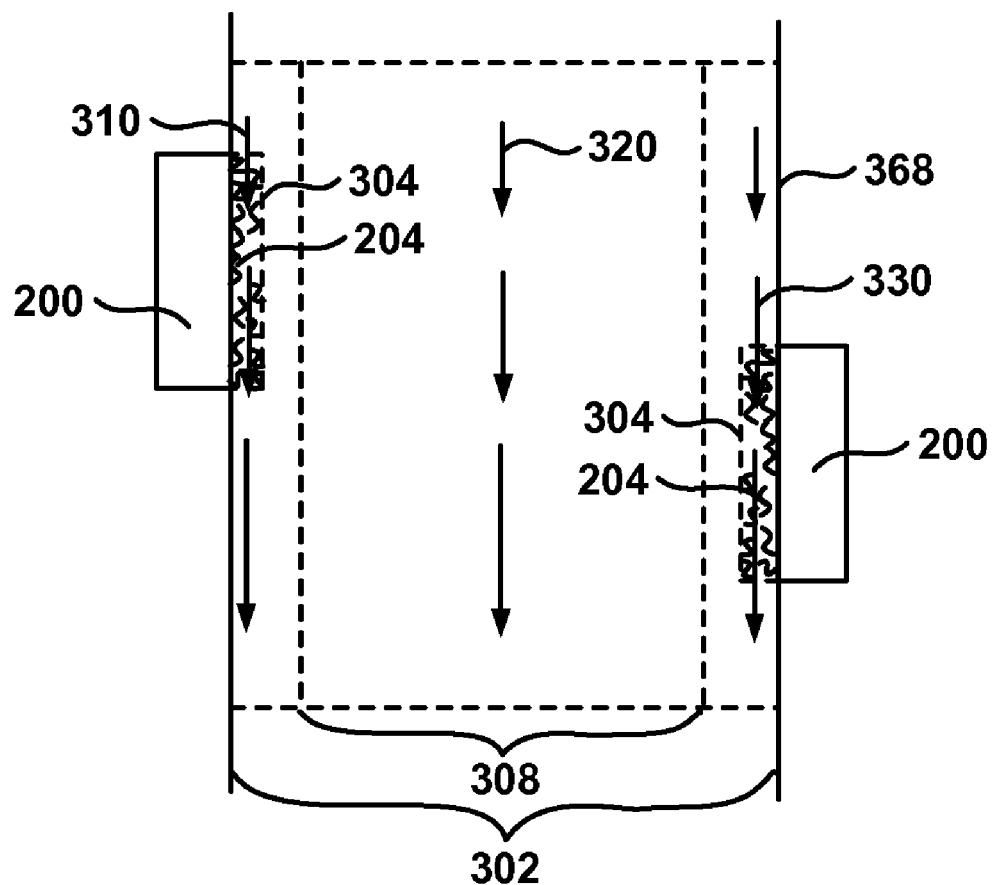

Although FIG. 3B depicts two pass-by filters 200 depicted on each side of a bypass channel 368 directly across from each other, pass-by filters 200 are not limited in how they 200 can be associated with the bypass channel 368. For example, one or more pass-by filters 200 may be attached to only one side of the bypass channel 368 or may not be directly across from each other. FIGS. 3C and 3D depict other ways that pass-by filters 200 can be associated with a bypass channel 368 and other orientations of various regions 302, 304, 308.

According to one embodiment, the pass-by filter 200 is an electrostatic pass-by filter that attracts particles from the air that have an opposite charge than the electrostatic pass-by filter. For example, if the electrostatic pass-by filter is negatively charged, it will attract positively charged particles. If the electrostatic pass-by filter is positively charged, it will attract negatively charged particles. According to one embodiment, a negatively charged pass-by filter is associated with one part of the disk drive and a positively charged pass-by filter is associated with another part of the disk drive. For example, a positively charged pass-by filter may be associated with one side a bypass channel 368 and a negatively charged pass-by filter may be associated with the other side of the bypass channel 368. Further, electro statically charged pass-by filter 200 can attract particles in the filter free region 308 to enter a filter region 304.

A Disk Drive that Reduces the Obstruction of Air Flow

Figure 4:
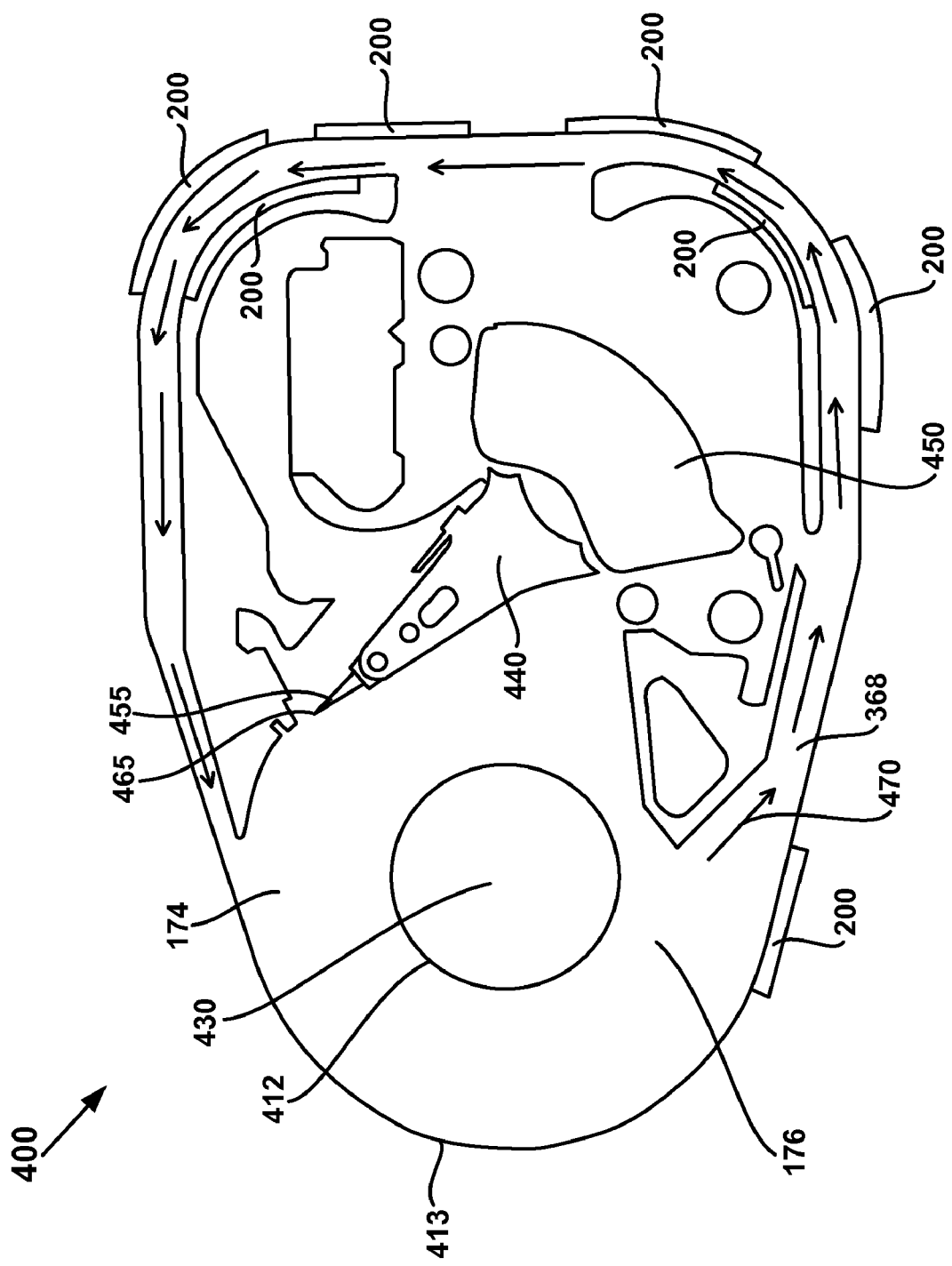
FIG. 4 depicts a disk drive for reducing obstruction of air flow through a bypass channel associated with the disk drive, according to one embodiment.

FIG. 4 depicts a disk drive for reducing obstruction of air flow through a bypass channel associated with the disk drive, according to one embodiment. The disk drive 400 depicted in FIG. 4 includes a base casting 413, a motor hub assembly 430, a disk 412, an actuator 440, a magnetic read write head 465, a slider 455, a voice coil motor 450, a bypass channel 368, and electrostatic pass-by filters 200. The bypass channel 368, according to one embodiment, is a channel that air flows through as indicated by the arrows. The bypass channel 368 starts at approximately position 176 where air flows away from the counterclockwise spinning disk 412, continues along the side, along the back, up the other side of the disk drive 400 and ends at approximately position 174 where air re-enters the region where the disk 412 is spinning The air is not obstructed at position 174, as depicted in FIG. 4, by a filter because as can be seen the air is not forced to flow through a conventional filter 172 as depicted in FIG. 1. Therefore, the disk drive 400 does not have to use more electrical energy to compensate for an increase in airflow turbulence. The voice coil motor 450 also does not have to use more electrical energy to stabilize the actuator 440 due to the increase in airflow turbulence.

The pass-by filters 200, according to one embodiment, can be associated with the bypass channel 368 in various ways so that the air does not have to flow through the pass-by filters 200. As depicted in FIG. 4, pass-by filters 200 are associated with the sides that are adjacent to the voice coil motor 450 and to a side of the bypass channel 368. However, the pass-by filters 200 can be associated with a disk drive 400 in a manner so that air will flow substantially unobstructed through the bypass channel 368. For example, pass-by filters 200 can be associated with almost any surface inside of a disk drive 400. The pass-by filters 200 could be associated with the side or bottom of the bypass channel 368, to the side adjacent to the voice coil motor 450, to the cover or a portion of the disk drive 400 or to a combination of places, among other areas. One or more pass-by filters 200 may be associated with the portion of the cover that is in proximity to the bypass channel 368. Strips of pass-by filters 200 may be associated with the cover. One or more pass-by filters may be associated with a disk drive 400 in proximity to position 176 where the air is at its highest pressure and velocity.

In yet another embodiment, a pass-by filter 200 is associated with the full surface of the disk drive 400's cover. For example, the cover of the disk drive 400 can be made in part or entirely of a pass-by filter 200. Filtering materials can be fused or weaved together and shaped into the full surface of the cover. In another example, filtering materials can be deposited onto a cover for example by spraying or painting a liquid that includes filtering materials onto the cover. The liquid evaporates leaving the filtering materials permanently bonded to the cover, according to one embodiment. The liquid may include an adhesive. In a third example, an adhesive may be applied to at least a portion of the cover and a pass-by filter 200 in the form of loose fibers may be blown onto the adhesive. Any fibers not bonded may be cleaned up using selective vacuuming.

Negatively and positively charged pass-by filters that are made according to the carrier 202, the liquid embodiment, or the loose fibers embodiment, can be associated with different parts of the selective filtering region. For example, a negatively charged pass-by filter may be on one side of the bypass channel 368 and a positively charged pass-by filter may be on the other side of the bypass channel 368. In another example, negatively charged pass-by filters and positively charged pass-by filters may be alternated for example on the disk drive's cover or on the same side of a bypass channel 368.

As already stated, the effectiveness of a filter to cleanup the environment inside of a disk drive is directly proportional to the size of the filter. Further, the space inside of a disk drive is limited. Therefore, the size of a conventional filter 172 as depicted in FIG. 1 is limited. However, the surface area of a pass-by filter 200 can be much greater than the surface area of the conventional filter 172 because, among other things, the air flow 170 is not forced through the pass-by filter 200. Therefore, the effectiveness of a pass-by filter 200, according to various embodiments, is much higher than that of conventional filters 172. In fact, one or more pass-by filters can be placed in many places in a disk drive 400. For example, the cover of one disk drive 400 could be one continuous pass-by filter. Another pass-by filter could run all along sides near the voice coil motor and yet another pass-by filter could run along the edge of the base casting, among other places, thus providing a large surface area for filtering contaminants, such as particles and vapors.

Figure 5:
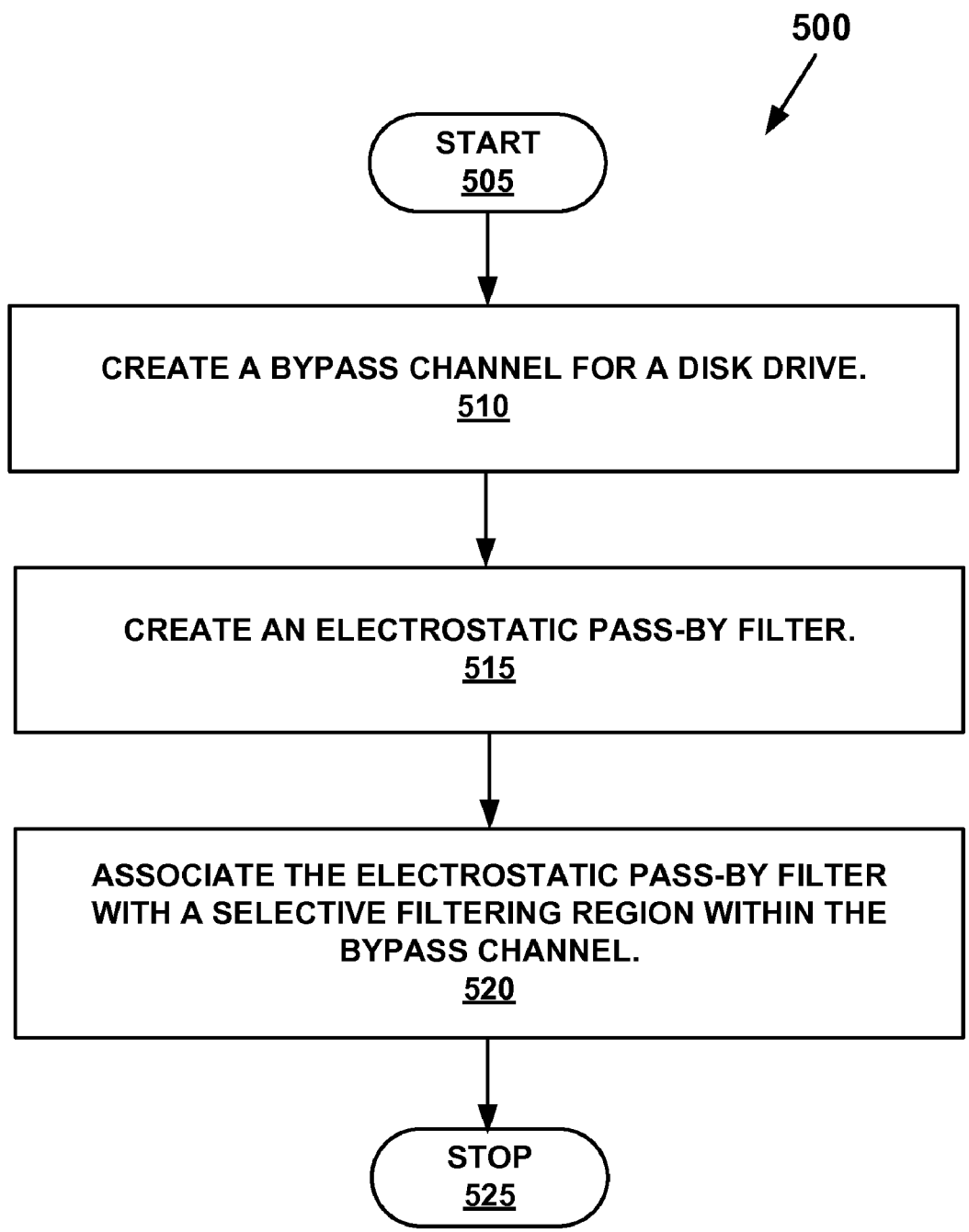
FIG. 5 depicts a flowchart describing a method of manufacturing a disk drive filtering system that reduces obstruction of air flow through a bypass channel associated with a disk drive, according to one embodiment of the present invention.

Operational Example of a Method of Manufactured Disk Drive Filtering Systems that Reduce Obstruction of Air Flow through a Bypass Channel Using an Electrostatic Filter FIG. 5 depicts a flowchart 500 describing a method of manufacturing a disk drive filtering system that reduces obstruction of air flow through a bypass channel associated with a disk drive using an electrostatic pass-by filter, according to one embodiment of the present invention. Although specific steps are disclosed in flowchart 500, such steps are exemplary. That is, embodiments of the present invention are well suited to performing various other steps or variations of the steps recited in flowchart 500. It is appreciated that the steps in flowchart 500 may be performed in an order different than presented, and that not all of the steps in flowchart 500 may be performed.

In step 505, the process begins.

In step 510, a bypass channel is created for the disk drive. For example, a bypass channel 368 is created by creating an enclosure for the disk drive 400 with a shape that provides the bypass channel 368. Further, various components such as the voice coil motor 450, the motor hub assembly 430 and the disks 412 are assembled in the disk drive 400 in a manner that provides for the demarcation of the bypass channel 368. Air can flow 470 through the bypass channel 368.

In step 515, a pass-by filter is created. For example, a pass-by filter 200 includes a carrier 202, such as clean room paper, has adhesive on both sides, and filtering materials 204 are attached to one of the adhesive sides. One of the pass-by filters may be negatively charged and another of the pass-by filters may be positively charged. In another example, a pass-by filter is a liquid that can be painted or sprayed onto various parts of a disk drive 400. One liquid may include filtering materials 204 that are negatively charged and another liquid may include filtering materials 204 that are positively charged. In yet another example, a pass-by filter includes loose filtering materials 204 that can be blown onto various parts of a disk drive 400. There may be one set of loose filtering materials 204 that is negatively charged and another set of loose filtering materials 204 that is positively charged.

In step 520, the pass-by filter can be associated with a selective filtering region within the bypass channel. In one example, the other adhesive side of pass-by filter's 200 carrier 202 can be used to attach the pass-by filter 200 to the bypass channel 368. A pass-by filter 200 with a carrier 202 can be made or cut into a shape that fits an area of the disk drive 400 that it will be attached to. In another example, a liquid pass-by filter can be sprayed or painted onto various parts of a disk drive 400. In yet another example, a pass-by filter made of loose filtering materials can be blown onto various parts of a disk drive 400.

Loose filtering materials 204 may be blown onto various parts of a disk drive 400. The liquid or loose filtering materials 204 may be applied before assembling the parts of the disk drive 400. For example, the liquid or loose filtering materials 204 may be applied to the inside of the base casting 413 that forms a part of the bypass channel 368 before the disk 412, the motor hub assembly 430, the actuator 440, among other things, are assembled into the disk drive 400. A liquid by-pass filter or by-pass filter that includes loose filtering materials 204 may also be applied to parts of other components such as the cover, sides that are adjacent to the voice coil motor 150, or a combination thereof.

Negatively and positively charged pass-by filters that are made according to the carrier embodiment, the liquid embodiment, or the loose fibers embodiment, can be associated with different parts of the selective filtering region. For example, a negatively charged pass-by filter may be on one side of the bypass channel 368 and a positively charged pass-by filter may be on the other side of the bypass channel 368. In another example, negatively charged pass-by filters and positively charged pass-by filters may be alternated for example on the disk drive's cover or on the same side of a bypass channel 368.

One or more pass-by filters can be associated with a disk drive component that is proximate to the bypass channel. Examples of disk drive components that are proximate to the bypass channel include but are not limited to a base casting, a cover, slit shroud, air diffuser, and airflow-spoiler system.

Referring now to FIG. 3C, the pass-by filter 200 can filter a first portion of air 310 that flows through the selective filtering region 302. A filter free region 308 is disposed proximate to the pass-by filter 200 so that a second portion of air 320 is allowed to flow substantially unobstructed through the selective filtering region 302. The amount of air 320 flowing through the filter free region 308 is significantly larger than the amount of air 310, 330 flowing through the filtering regions 304. Air swirls around as it travels down a bypass channel 368. Air in the filter free region 308 can move into the filtering regions 304 and vice versa. The electrostatic pass-by filter 200 attracts particles that have the opposite charge of the electrostatic pass-by filter 200. The electrostatic pass-by filter 200 can cause oppositely charged particles to move from a portion of air 320 that flows through the filter free region 308 to another portion of air 310 that flows through a filtering region 304. Due to the swirling of the air and/or the attracting of opposite charged particles, among other things, a significant amount of particles can be removed from the air while at the same time allowing the air flow to be significantly unobstructed.

In step 525, the process ends.

The steps of flowchart 500 can be performed in many different orders. For example, in the case of a pass-by filter that is made of liquid or loose filtering materials, the pass-by filter can be created (515), the liquid or loose filtering materials can be associated with various parts of the disk drive (520) prior to assembling the parts, then the parts can be assembled to create the bypass channel (510).

The disk drive can be powered on at the manufacturers, for example, for a short period of time and the electrostatic pass-by filters can remove a significant number of negatively and positively charged particles from the disk drive. The disk drive can be powered off and shipped to a customer. When the customer powers the disk drive on, the electrostatic pass-by filters may continue to remove negatively and positively charged particles for the life span of the disk drive, for example.

Conclusion

According to various embodiments of the present invention, pass-by filters can be used to allow air to flow substantially unobstructed through a bypass channel of a disk drive. Therefore, less heat is generated, the TMR is lowered so more data can be stored on a disk drive, and the environment of a disk drive can be cleaned more quickly and remain cleaner, among other things, than is the case with disk drives using conventional filters. The reduction in heat and the cleaner environment results in a longer life time for a disk drive and a lower probability of losing data, among other things. Further, a company that can manufacture disk drives with higher reliability, longer life time, or a higher density of data is positioned to be more profitable and deliver a more competitive product.

Using pass-by filters, for example, enables a manufacturer of disk drives to reduce the amount that various components in the disk drive are washed prior to assembly, thus, various embodiments can be used to lower the cost of the disk drives providing a significant competitive edge to the manufacturer. Manufacturers of disk drives have been attempting to reduce the cost of disk drives for a long time. Therefore, there has been a long felt need for various embodiments of the present invention.

The conventional filter 172 (FIG. 1) has been used for a long time without significant changes in its design other than varying its size. Therefore, there has been a long felt need for the reduction in generated heat, the higher density of stored data, and the cleaner environment provided by a pass-by filter manufactured according to various embodiments of the present invention.

Further, the results provided by a pass-by filter manufactured according to various embodiments of the present invention are evident by experiment or simulation. Typically, the industry has provided a cleaner environment inside of a disk drive by making the conventional filter 172 bigger. However, this resulted in taking up valuable space inside of the disk drive and in further obstruction of the air flow 170. Therefore, the industry has had a difficult time finding a way to simultaneously solve all of the problems that can be solved by pass-by filters manufactured according to various embodiments of the present invention.

Although various embodiments were described in combination with each other or were described not in combination with each other, any embodiment may be combined with any other embodiment. For example, if embodiment A and B were described as a combination, embodiment A may be combined with embodiment C or embodiment B may be combined with embodiment C. In another example, if embodiment D and F were described separately, embodiment D and F may be combined.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A disk drive filtering system for reducing the obstruction of air flow through a bypass channel associated with a disk drive, the disk drive filtering system comprising:
   a selective filtering region disposed within a bypass channel;
   an electrostatic pass-by filter disposed within the selective filtering region, the electrostatic pass-by filter comprising:
      a negatively charged electrostatic pass-by filter portion on a first side of the selective filtering region;
      a positively charged electrostatic pass-by filter portion on a second side of the selective filtering region, said second side different from said first side, wherein the positively charged electrostatic pass-by filter portion and the negatively charged electrostatic pass-by filter portion are configured to filter the air that flows through the selective filtering region; and
   a filter free region disposed proximate to the positively charged electrostatic pass-by filter and the negatively charged electrostatic pass-by portion, wherein a portion of the air is allowed to flow substantially unobstructed through the selective filtering region.

2. The disk drive filtering system of claim 1, wherein the electrostatic pass-by filter includes a carrier that filtering materials can be associated with.

3. The disk drive filtering system of claim 1, wherein the electrostatic pass-by filter is a liquid that includes electrostatic filtering materials.

4. The disk drive filtering system of claim 1, wherein the electrostatic pass-by filter includes an adhesive.

5. The disk drive filtering system of claim 1, wherein the electrostatic pass-by filter includes loose electrostatic filtering materials.

6. The disk drive filtering system of claim 5, wherein the loose electrostatic filtering materials are blown onto a part of a component associated with the disk drive.

7. The disk drive filtering system of claim 1, wherein the electrostatic pass-by filter is created by a method selected from a group consisting of weaving filtering materials together and fusing at least a part of the filtering materials.

8. The disk drive filtering system of claim 1, wherein the electrostatic pass-by filter is attached to a disk drive component that is proximate to the selective filtering region selected from the group consisting of a base casting, a cover, and a side adjacent to a voice coil motor.

9. A disk drive for reducing obstruction of air flow through a bypass channel associated with the disk drive, the disk drive comprising:

a selective filtering region disposed within a bypass channel;

an electrostatic pass-by filter disposed within the selective filtering region, the electrostatic pass-by filter comprising:

a negatively charged electrostatic pass-by filter portion on a first side of the selective filtering region;

a positively charged electrostatic pass-by filter portion on a second side of the selective filtering region, said second side different from said first side, wherein the positively charged electrostatic pass-by filter portion and the negatively charged electrostatic pass-by filter portion are configured to filter the air that flows through the selective filtering region; and a filter free region disposed proximate to the positively charged electrostatic pass-by filter portion and the negatively charged electrostatic pass-by filter portion, wherein a portion of the air is allowed to flow substantially unobstructed through the selective filtering region.

10. The disk drive of claim 9, wherein the electrostatic pass-by filter is near a location where air exits from the disk drive's spinning disk.

11. The disk drive of claim 9, wherein said negatively charged pass-by filter portion is associated with one side of the bypass channel and said positively charged pass-by filter portion is associated with the other side of the by-pass channel.

12. The disk drive of claim 9, wherein negatively charged pass-by filter portion and the positively charged pass-by filter portion are associated with the disk drive in alternating positions.

13. The disk drive of claim 9, wherein an adhesive is applied to a part of a disk drive component and the electrostatic pass-by filter is blown onto the adhesive.

14. The disk drive of claim 9, wherein the electrostatic pass-by filter is a liquid that is applied to a part of the disk drive.

15. The disk drive of claim 9, wherein the electrostatic pass-by filter includes activated charcoal.

* * * * *

UNITED STATES PATENT AND TRADEMARK OFFICE
CERTIFICATE OF CORRECTION

PATENT NO. : 8,390,950 B2
APPLICATION NO. : 13/173780
DATED : March 5, 2013
INVENTOR(S) : Norbert A. Feliss, Donald R. Gillis and Ferdinand Hendriks Page 1 of 1

It is certified that error appears in the above-identified patent and that said Letters Patent is hereby corrected as shown below:

In the Claims:

Column 10, Claim 1, Line 66: Delete: "charged electrostatic pass-by filter and the negatively"
Insert: --charged electrostatic pass-by filter portion and the negatively--

Signed and Sealed this
Sixth Day of August, 2013

Teresa Stanek Rea
*Acting Director of the United States Patent and Trademark Office*